United States Patent
Gilbert et al.

(10) Patent No.: US 7,708,132 B2
(45) Date of Patent: May 4, 2010

(54) ADJUSTMENT SYSTEM FOR A SPEED REDUCTION BELT ASSEMBLY

(75) Inventors: Sylvain Gilbert, St-Prime (CA); Daniel Paré, St-Prime (CA)

(73) Assignee: Les Produits Gilbert Inc., Roberval, Quebec (CA)

(*) Notice: Subject to any disclaimer, the term of this patent is extended or adjusted under 35 U.S.C. 154(b) by 693 days.

(21) Appl. No.: 11/514,532

(22) Filed: Aug. 31, 2006

(65) Prior Publication Data

US 2008/0058139 A1 Mar. 6, 2008

(51) Int. Cl.
*B65G 21/10* (2006.01)

(52) U.S. Cl. ............ 198/588; 198/589; 198/861.2; 198/861.4; 198/861.6

(58) Field of Classification Search .......... 198/369.5, 198/588, 589, 592, 806, 807, 809, 861.1–861.6
See application file for complete search history.

(56) References Cited

U.S. PATENT DOCUMENTS

| | | | | |
|---|---|---|---|---|
| 1,617,490 A * | 2/1927 | Knox | ............. | 198/536 |
| 2,762,490 A * | 9/1956 | Kling | ............. | 198/589 |
| 3,169,630 A * | 2/1965 | Christiansen | ......... | 209/600 |
| 3,581,874 A * | 6/1971 | Keith | ............. | 198/317 |
| 3,904,024 A * | 9/1975 | Smith | ............. | 414/788.7 |
| 5,168,978 A * | 12/1992 | Cox et al. | ......... | 198/369.5 |
| 5,875,883 A * | 3/1999 | Ertel et al. | ......... | 198/821 |
| 6,186,317 B1 * | 2/2001 | Hovsto et al. | ......... | 198/806 |
| 6,431,346 B1 * | 8/2002 | Gilmore et al. | ......... | 198/588 |
| 6,464,426 B1 * | 10/2002 | Girouard | ........ | 404/101 |
| 6,543,622 B1 * | 4/2003 | Fridman | ......... | 209/421 |
| 6,845,859 B2 * | 1/2005 | Grundl | ........... | 198/314 |
| 7,267,517 B2 * | 9/2007 | Kinzer | ......... | 414/272 |
| 7,472,785 B2 * | 1/2009 | Albright et al. | ....... | 198/589 |

\* cited by examiner

*Primary Examiner*—Douglas A Hess
(74) *Attorney, Agent, or Firm*—Merchant & Gould P.C.

(57) ABSTRACT

An automated adjustment system is provided for positioning a speed reduction belt assembly to receive an elongated wood article exiting a processing machine. The speed reduction belt assembly has opposite first and second ends. The automated adjustment system includes a horizontal adjustment mechanism operable to adjust an angle of the speed reduction belt assembly in a horizontal plane. The automated adjustment system also includes a vertical adjustment mechanism operable to adjust the height of one of the first and second ends of the belt assembly relative to the other of the first and second ends of the belt assembly, thereby adjusting an inclination of the belt assembly. The automated adjustment system further includes a control unit in communication with the horizontal and vertical adjustment mechanisms for sending control signals thereto. The control signals determine the angle and inclination of the belt assembly.

26 Claims, 6 Drawing Sheets

ADJUSTMENT SYSTEM FOR A SPEED REDUCTION BELT ASSEMBLY

FIELD OF THE INVENTION

The present invention relates to wood processing machinery. More particularly, the present invention concerns an automated adjustment system for a speed reduction belt assembly.

BACKGROUND OF THE INVENTION

In the wood processing industry, it is common for modern planers to operate at speeds of 3000 feet per minute. It is known to position a speed reduction belt assembly in front of such a planer, or other processing machine of a similar type, in order to receive an elongated article, such as a plank of wood, as it exits the processing machine in order to slow down the planed wooden plank.

A speed reduction belt assembly typically provides a continuous surface traveling at a lower speed in order to receive the wooden planks as they exit the planer and thereby reduce the speed of the planks so that they may be transferred for further processing, or stacked for storage or shipping.

Typically, a conventional speed reduction belt assembly normally consists of a continuous belt that rotates around a pair of end pulleys, and a frame which supports this assembly. The belt is typically several feet in width and the belt assembly can be up to 30 feet in length.

It is further known to adjust the horizontal angle, the height and the inclination of a speed reduction belt assembly, with respect to the planer, in order to optimize the reception and deceleration of the planks. Improperly received planks can collide or land on each other and cause jams and equipment breakdowns, resulting in lost production and costly delays. Such adjustments are usually made by hand or with the aid of additional pushing or lifting machinery, which can be burdensome as speed reduction belt assemblies are large, cumbersome and difficult to position.

In view of the above, there is therefore a need for an improved adjustment system for a speed reduction belt assembly whose orientation and alignment are easily adjustable.

SUMMARY OF THE INVENTION

An object of the present invention is to provide an adjustment system for a speed reduction belt assembly which, by virtue of its design and components, satisfies some of the above-mentioned needs and is thus an improvement over other related assemblies known in the prior art.

Another object of the present invention is to provide an adjustment system which automates adjustment of a speed reduction belt assembly.

In accordance with a first aspect of the present invention, there is therefore provided an automated adjustment system for positioning a speed reduction belt assembly to receive an elongated wood article exiting a processing machine. The speed reduction belt assembly has opposite first and second ends. The automated adjustment system includes a horizontal adjustment mechanism operable to adjust an angle of the speed reduction belt assembly in a horizontal plane. The automated adjustment system also includes a vertical adjustment mechanism operable to adjust the height of one of the first and second ends of the belt assembly relative to the other of the first and second ends of the belt assembly, thereby adjusting an inclination of the belt assembly. The automated adjustment system further includes a control unit in communication with the horizontal and vertical adjustment mechanisms for sending control signals thereto. The control signals determine the angle and inclination of the belt assembly.

In a preferred embodiment, the horizontal adjustment mechanism includes a fixable base, a substantially vertical pivot provided between the fixable base and the belt assembly for enabling the belt assembly to pivot about the base in the horizontal plane, and a horizontal adjustment actuator operable to rotate the belt assembly about the substantially vertical pivot.

Also in a preferred embodiment, the vertical adjustment mechanism includes first and second vertical supports for supporting the first and second ends of the belt assembly, respectively. The first vertical support is preferably hingedly connected to the belt assembly and preferably includes a first vertical actuator. The second vertical support preferably includes a second vertical actuator, thereby enabling the vertical adjustment mechanism to adjust the height and inclination of the belt assembly.

In accordance with another aspect of the present invention, a speed reduction belt for receiving an elongated wood article exiting a processing machine is provided.

The speed reduction belt assembly has opposite first and second ends, and includes an automated adjustment system. The automated adjustment system includes a horizontal adjustment mechanism operable to adjust an angle of the speed reduction belt assembly in a horizontal plane. The automated adjustment system also includes a vertical adjustment mechanism operable to adjust the height of one of the first and second ends of the belt assembly relative to the other or the first and second ends of the belt assembly, thereby adjusting an inclination of the belt assembly. The automated adjustment system further includes a control unit in communication with the horizontal and vertical adjustment mechanisms for sending control signals thereto. The control signals determine the angle and inclination of the belt assembly.

Advantageously, this present invention simplifies the adjustment of a speed reduction belt assembly.

The invention and its advantages will be better understood by reading the following non-restrictive description of a preferred embodiment thereof, made with reference to the accompanying drawings.

BRIEF DESCRIPTION OF THE DRAWINGS

These and other objects and advantages of the invention will become apparent upon reading the detailed description and upon referring to the drawings in which.

DETAILED DESCRIPTION OF PREFERRED EMBODIMENTS OF THE INVENTION

In the following description, the same numerical references refer to similar elements. The embodiments shown in the figures are preferred, for exemplification purposes only.

In the context of the present description, the expression "lumber" includes all types of elongated wood products, as apparent to a person skilled in the art. For this reason, the expressions "plank" or "article", for example, should not be taken as to limit the scope of the present invention and includes all other kinds of usages or items with which the present invention may be used and could be useful.

In addition, although the preferred embodiments of the present invention as illustrated in the accompanying drawings include various components, etc., and although the preferred embodiments of the speed reduction belt assembly and corresponding parts of the present invention as shown consist of certain geometrical configurations as explained and illustrated herein, not all of these components and geometries are essential to the invention and thus should not be taken in their restrictive sense, i.e. should not be taken as to limit the scope of the present invention. It is to be understood, as also apparent to a person skilled in the art, that other suitable components and cooperations therebetween, as well as other suitable geometrical configurations may be used for the speed reduction belt assembly according to the present invention, as will be briefly explained herein and as can be easily inferred herefrom by a person skilled in the art, without departing from the scope of the invention.

Figure 1A:
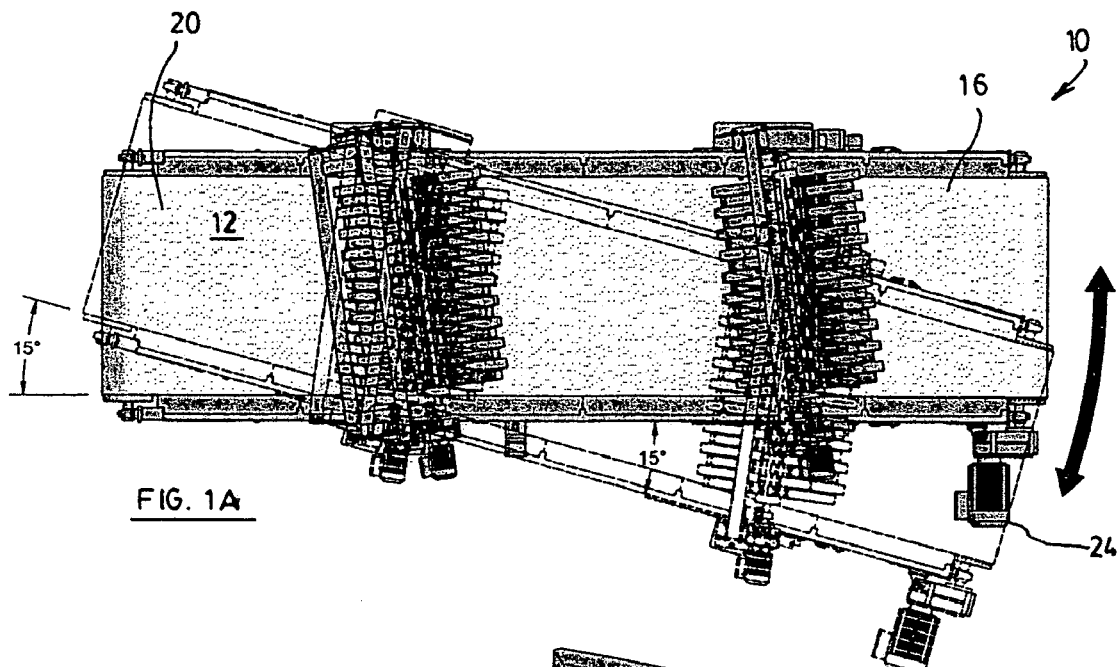
FIG. 1A is a top view of a speed reduction belt assembly in accordance with an embodiment of the present invention, showing two possible angles thereof in the horizontal plane.
Figure 1B:
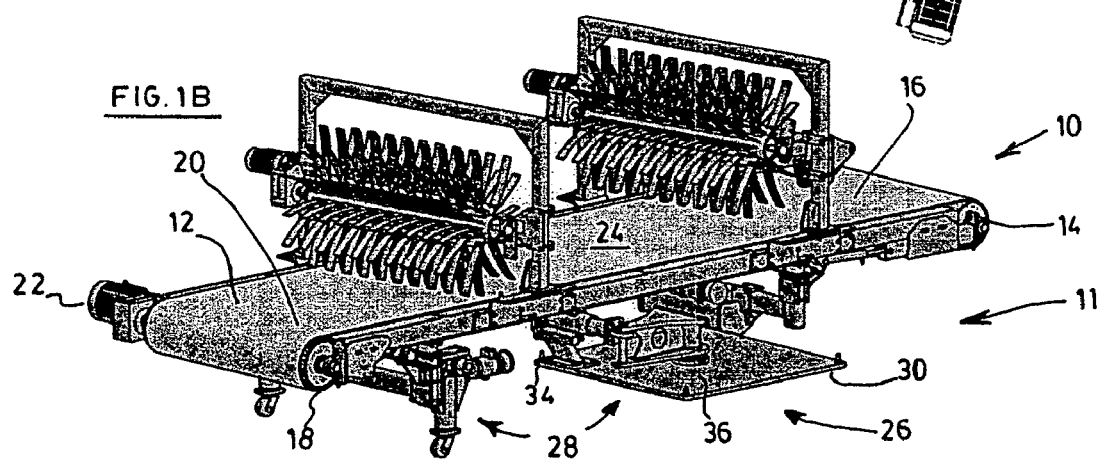
FIGS. 1B and 1C are perspective views of the speed reduction belt assembly of FIG. 1A for each angle in the horizontal plane shown thereon.
Figure 1C:
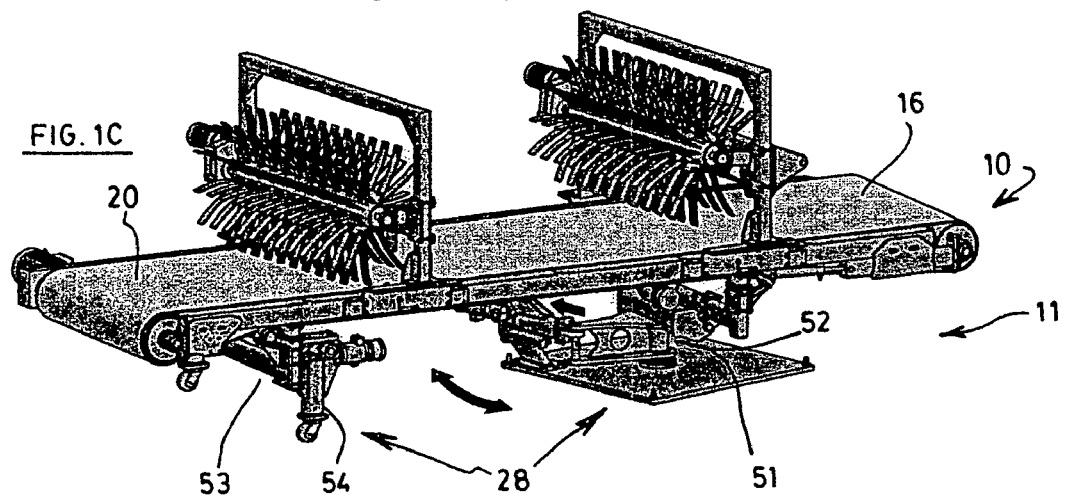

Referring to FIGS. 1A to 1C, the present invention relates to a speed reduction assembly 10, and more particularly concerns an automated adjustment system 11 therefor. The speed reduction assembly 10 preferably includes a continuous belt 12 which extends around and between a first pulley 14 at a first end 16 of the assembly 10, and a second pulley 18 at a second end 20 opposite the first end 16.

The designations of "first" and "second" ends are used herein for convenience of reference only, and do not refer to any preferred orientation of the assembly. The belt 12 has an upper side 24, i.e. the portion thereof that at any moment in time is facing upwards, which can therefore act as a conveyor. A belt motor 22 is preferably provided to rotate the belt 12. In a preferred embodiment, the motor 22 is an electric motor with an output shaft attached to the second pulley 18 and capable of imparting a rotational motion to the second pulley 18, which in turn drives the belt 12 and rotates the first pulley 14, as is known in the art. However, as will be apparent to a person skilled in the art, other arrangements for driving the belt 12, such as providing the motor 22 in a different configuration, the use a different type of motor, or the use of an additional motor or motors, are applicable to the present invention.

In use, the speed reduction belt assembly 10 is positioned adjacent a processing machine (not illustrated), such as a planer, contouring machine, molder or the like, to receive an elongated wood article on the upper side 24 of the belt 12 and thereby slow the article. The translational speed of the upper side 24 of the belt 12 is preferably controllable through control of the motor 22.

As mentioned above, the present invention provides an adjustment system 11 for the speed reduction belt assembly 10. The adjustment system 11 includes both a horizontal 26 and a vertical 28 adjustment mechanism, as will be described in more detail in the following sections with reference to preferred embodiments thereof. A control unit is also provided for controlling the horizontal and vertical adjustment mechanisms, which will be discussed in detail further below.

Horizontal Adjustment Mechanism

The horizontal adjustment mechanism 26 is operable to adjust the angle of the speed reduction assembly in the horizontal plane, with respect to the exit direction of the elongated wood article from the processing machine.

Figures 2A, 2B:
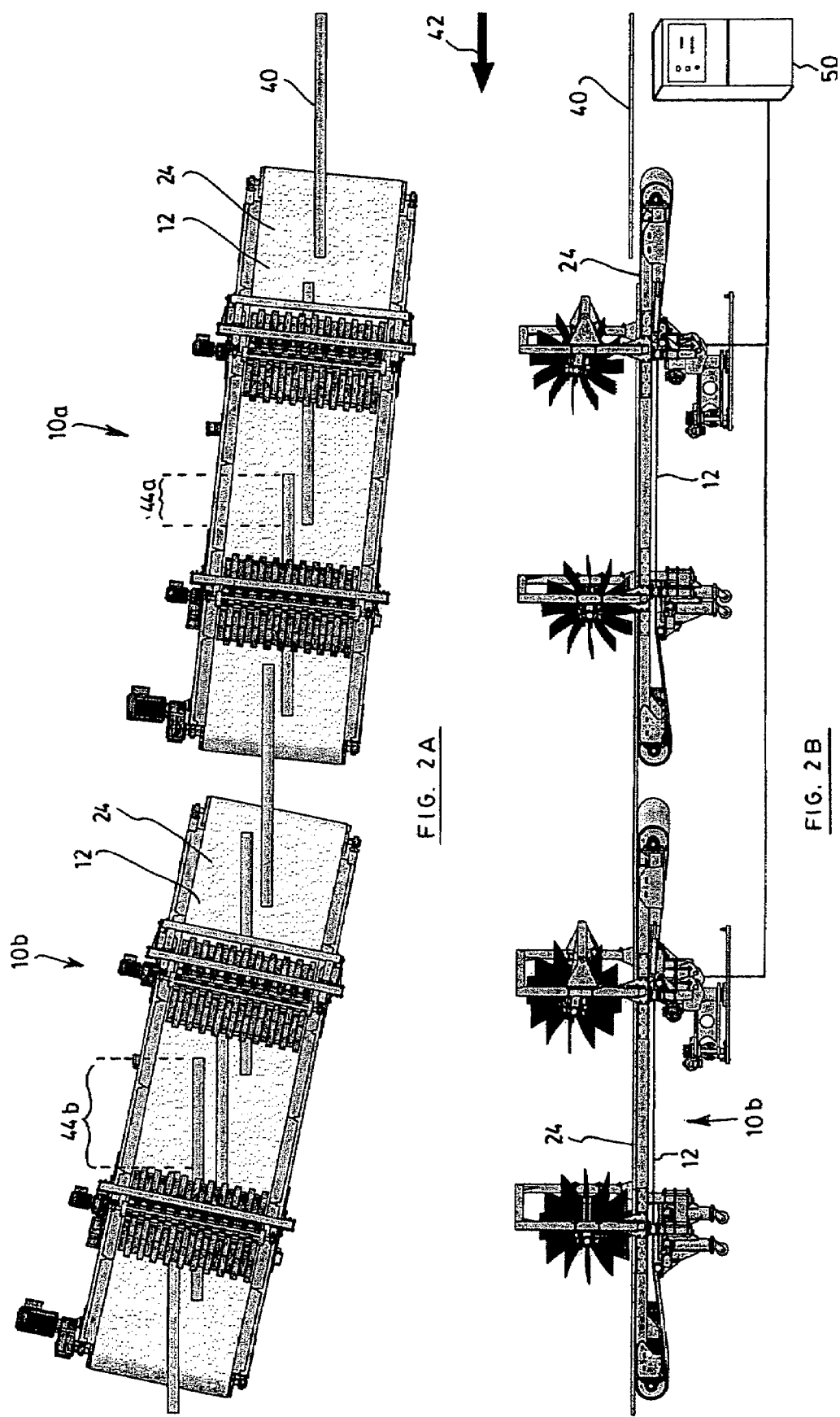
FIGS. 2A and 2B are top and side plan views, respectively, of a series of speed reduction belt assemblies as shown in the previous Figures.

With particular reference to FIGS. 2A and 2B, a plurality of planks 40 are illustrated exiting the processing machine (not shown), such as a planer, along an exit direction 42, and being received on a first speed reduction belt assembly 10a followed by a second speed reduction belt assembly 10b. While providing a second assembly is not generally necessary, and is depicted herein for illustrative purposes only, it may be advisable for boards exiting at high speeds, for example in excess of 4000 feet per minute.

The first assembly 10a is oriented in the horizontal plane at an angle to the direction 42 of the exiting planks 40. This is because the planks 40 exit the planer one after another with little or no space between subsequent planks. As the planks 40 land on the upper surface 24 of the belt 12 and through contact therewith are slowed to the speed of the belt 12, the direction of their motion is also changed to that of the belt 12. However, while the direction of motion of each plank 40 is changed its general orientation is not, i.e. the planks 40 remain pointing in substantially the same direction 42 along which they exited the planer. The result of this reorientation is that successive planks 40 on belt 12 overlap, as seen at 44a. Without this angled overlapping, successive planks 40 would collide as a front plank slowed before a faster moving rear plank.

It will be noted that this principle is continued as each plank 40 transitions from the first assembly 10a to the even slower traveling second assembly 10b, which is oriented at an even greater angle in the horizontal plane with respect to the exit direction 42. The resultant overlap 44b is therefore also greater than overlap 44a on the first assembly 10a.

The horizontal angle of the assembly 10 therefore needs to be optimized in accordance with the width of the planks 40: the greater the width of the planks to be slowed, the more lateral distance is required therebetween to avoid a collision after being slowed. Therefore a greater angle of speed reduction assembly 10 in the horizontal plane is required.

Referring back to FIGS. 1A to 1C, in accordance with a preferred embodiment of the invention, the horizontal adjustment mechanism 26 includes a fixable base 30, a substantially vertical pivot 36 and a horizontal adjustment actuator 34. The fixable base 30 is preferably rigidly retained to the shop floor, or other supporting surface. The vertical pivot 36 is provided between the fixable base 30 and the belt assembly 10 for enabling the belt assembly 10 to pivot about the base 30 in the horizontal plane, as shown in FIG. 1C.

Figures 6A, 6B:
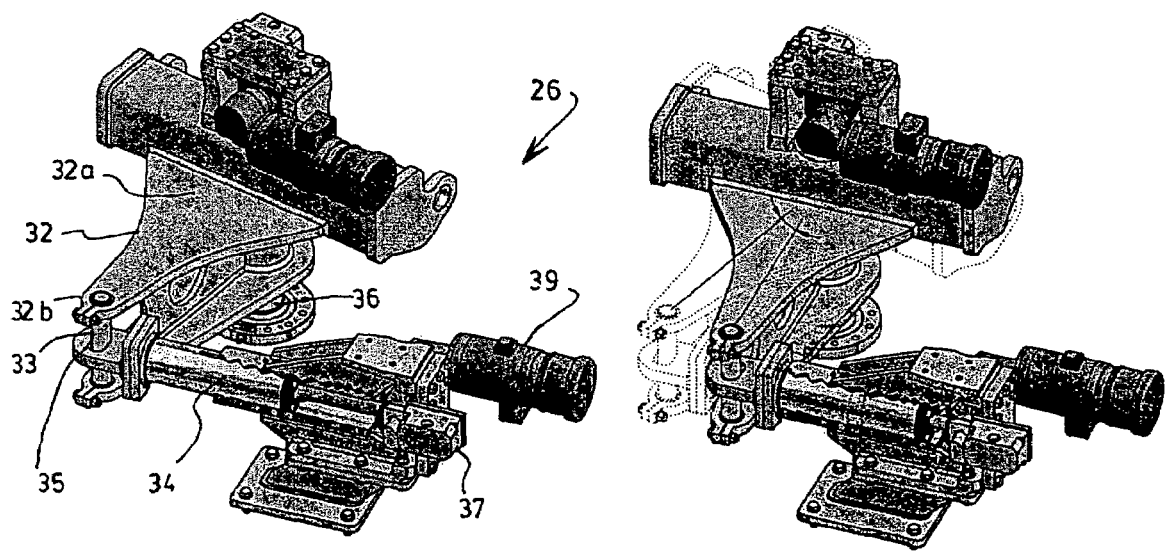
FIGS. 6A and 6B are perspective views of a portion of the horizontal adjustment mechanism, shown in two different horizontal positions.

Referring to FIGS. 6A and 6B, in the illustrated preferred embodiment, the horizontal adjustment actuator 34 is a linear actuator, or more precisely a screw jack, but may also be, as will be apparent to a person skilled in the art, another type of actuator, such as a hydraulic or pneumatic actuator. A position encoder 37 for encoding the position of the actuator 34 and a servo motor 39 for driving the linear actuator 34 are further provided on horizontal adjustment mechanism 26.

Extending horizontally from the pivot 36 is a horizontal arm 32 having a first extremity 32a rotatable around the pivot 36 and a second extremity 32b which engages the horizontal adjustment actuator 34. In operation, the actuator 34 is operable to apply a force to the second extremity 32b of the arm 32 in a direction at least partially perpendicular thereto, so as to rotate the arm 32, and consequently the belt assembly 10, about the vertical pivot 36. The arm 32 is therefore operable to pivotally engage the horizontal adjustment actuator 34, which itself is fixedly attached to the base 30 (see FIGS. 1B and 1C)

so as to enable the rotation of arm 32 about pivot 36, and thereby adjust the horizontal angle of the belt assembly 10. This engagement is preferably accomplished via a substantially vertical pin 33, located at the second extremity 32*b* of arm 32, which is received in a corresponding slot 35 at the end of linear the actuator 34. The slot 35 preferably has an elongated shape such that arm 32 can pivot about the pivot 36 upon being pushed linearly by the linear actuator 34, whose orientation remains fixed with respect to the base 30. While the horizontal adjustment mechanism 26 has been illustrated herein with arm 32 including the pin 33 and the actuator 34 including the slot 35, this should be considered in no way limiting as the reverse, i.e. the arm 32 including a slot 35 and the actuator 34 including a pin 33, is within the scope of the present invention.

With specific reference to FIG. 1A, the angular travel of the belt assembly 10 in the horizontal plane is preferably approximately + or −15°, although arrangements with more or less travel are also possible and within the scope of the invention. In addition, it will further be apparent to a person of skilled in the art that other arrangements for pivoting the assembly 10, for example rotational actuators acting directly on the vertical pivot 36, are within the scope of the present invention.

In the embodiment illustrated in the drawings, horizontal adjustment mechanism 26 is provided on the side of assembly 10 proximate to the exit of the planer. In this configuration, which is to be considered in no way limiting, the first end 16 can advantageously remain near to the exit of the planer regardless of the horizontal orientation of assembly 10.

Vertical Adjustment Mechanism

With reference to FIGS. 1A to 1C and 3A to 3D, the automated adjustment system 11 further includes a vertical adjustment mechanism 28 for adjusting the relative heights of the first and second ends 16 and 20 of the belt assembly 10, or in other words, its inclination.

The automated adjustment system 11 is operable to allow a user to optimize the angle of inclination of belt assembly 10 in accordance with the length of the planks 40. As a general, although non-limiting, rule the greater the length of the planks 40 to be slowed, the greater the angle of inclination required. For example, the belt assembly 10 will receive and engage an 8 foot plank exiting a planer at a given speed in less time than it would a 16 foot plank. The longer a plank takes to exit a processing machine, the more its front end will tip over as it falls. Therefore, in order to ensure a smooth engagement, the larger plank is given a greater angle of inclination in order to accommodate and match the resultant inclination of the plank. In addition, the height of the belt assembly 10 can similarly be optimized by the automated adjustment system 11 in order to properly receive and engage planks in the smoothest manner possible.

First and second vertical supports 51 and 53 are provided for supporting the first and second ends 16 and 20, respectively. In order to adjust the inclination of the belt assembly 10, the vertical adjustment mechanism 28 preferably includes at least one of a first vertical actuator 52 associated with first vertical support 51 and a second vertical actuator 54 associated with second vertical support 53. While only one of the first and second vertical supports 51 and 53 is required to include a vertical actuator in order to adjust the inclination of the belt assembly 10, in the preferred embodiment both the first and second vertical actuators 52 and 54 are present. In addition to increasing the versatility of the inclination adjustment, the combination of the first and second vertical actuators 52 and 54 at the first and second ends 16 and 20, respectively, also enable the adjustment of the height of the belt assembly 10 itself, as will be discussed in further detail below.

It will be noted that for the purposes of the present invention, the first and second vertical supports 51 and 53 do not need to be located at the very extremities of the belt 12, and indeed, in the illustrated embodiment, they are not. It is sufficient that each end 14 and 16 of the belt assembly be sufficiently supported so that the assembly is stable and solid enough to be operational.

Figures 5A, 5B:
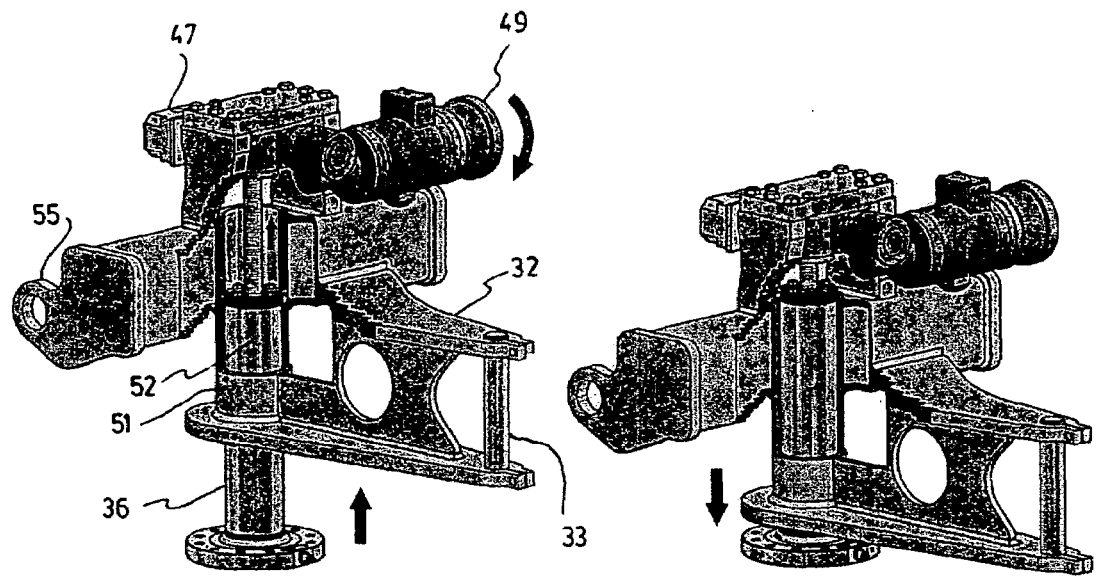
FIGS. 5A and 5B are perspective views of another portion of the vertical adjustment mechanism, shown in two different vertical positions.

With specific reference to FIGS. 5A and 5B, the first vertical actuator 52 is illustrated in detail. Preferably the first vertical actuator 52 is a linear actuator, or more preferably a screw jack, but may also be, as will be apparent to one skilled in the art, another type of actuator, such as a hydraulic or pneumatic actuator. A position encoder 47 for encoding the position of the first actuator 52 and a servo motor 49 for driving the first actuator 52 are further provided.

Figure 3A:
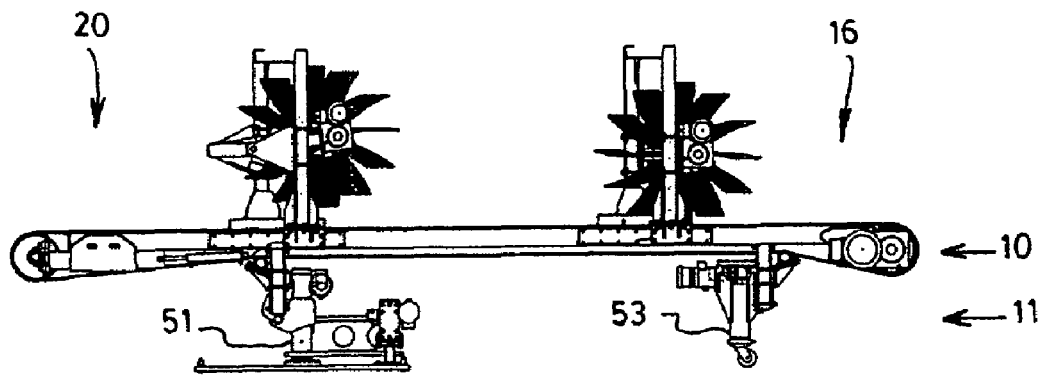
FIGS. 3A to 3D are side plan views of the speed reduction belt assembly with an automated adjustment system in accordance with the present invention, illustrating different positions of the vertical adjustment mechanism.
Figure 3B:
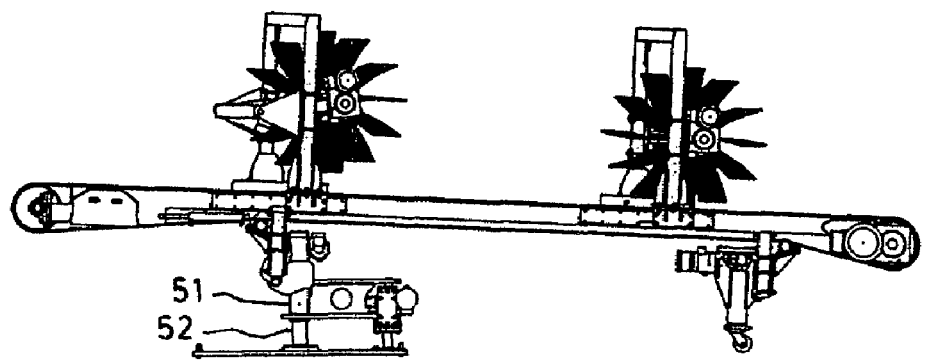
Figure 3C:
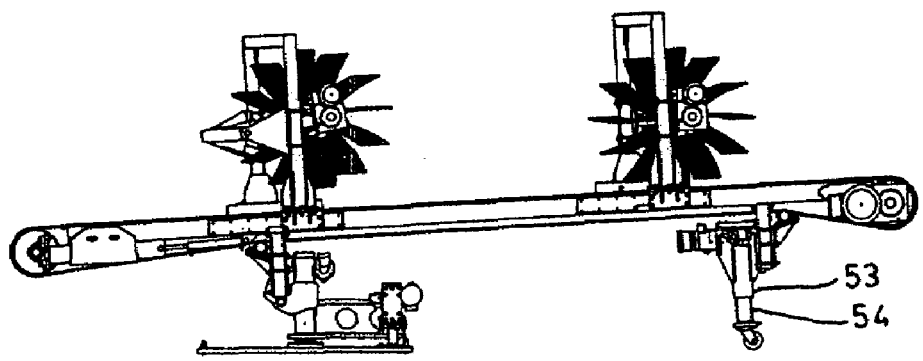
Figure 3D:
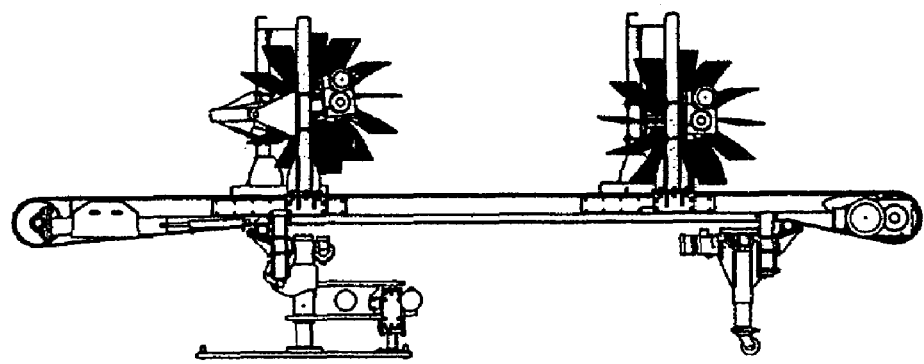

As shown here, the first vertical actuator 52 is aligned with the vertical pivot 36 of the horizontal adjustment assembly, between base 30 and belt assembly 10 (see FIGS. 1B and 1C). As such, when the first vertical actuator 52 is extended and the first end 16 of the belt assembly 10 is raised, the horizontal arm 32 is moved upwards therewith and away from the base 30 and the horizontal adjustment actuator 34. To accommodate for this, the length of vertical pin 33 is made at least equal to the travel of first vertical actuator 52. FIGS. 3A and 3C illustrate the first vertical actuator 52 in a contracted position, while FIGS. 3B and 3D illustrate the first vertical actuator 52 in an extended position.

The first vertical support 51 is hingedly connected by a bracket 55 to the belt assembly 10. Because during operation of the preferred embodiment of the present invention, the first vertical support 51 is fixed to the base 30, which itself is fixed rigidly to the ground, and therefore maintains its substantially vertical alignment during extension and contraction, the bracket 55 is operable to allow the belt assembly 10 to pivot with respect to the first vertical support 51. As such, the substantially vertical alignment of the first vertical support 51 is maintained while the inclination of the belt assembly 10 is adjusted.

Figure 4A:
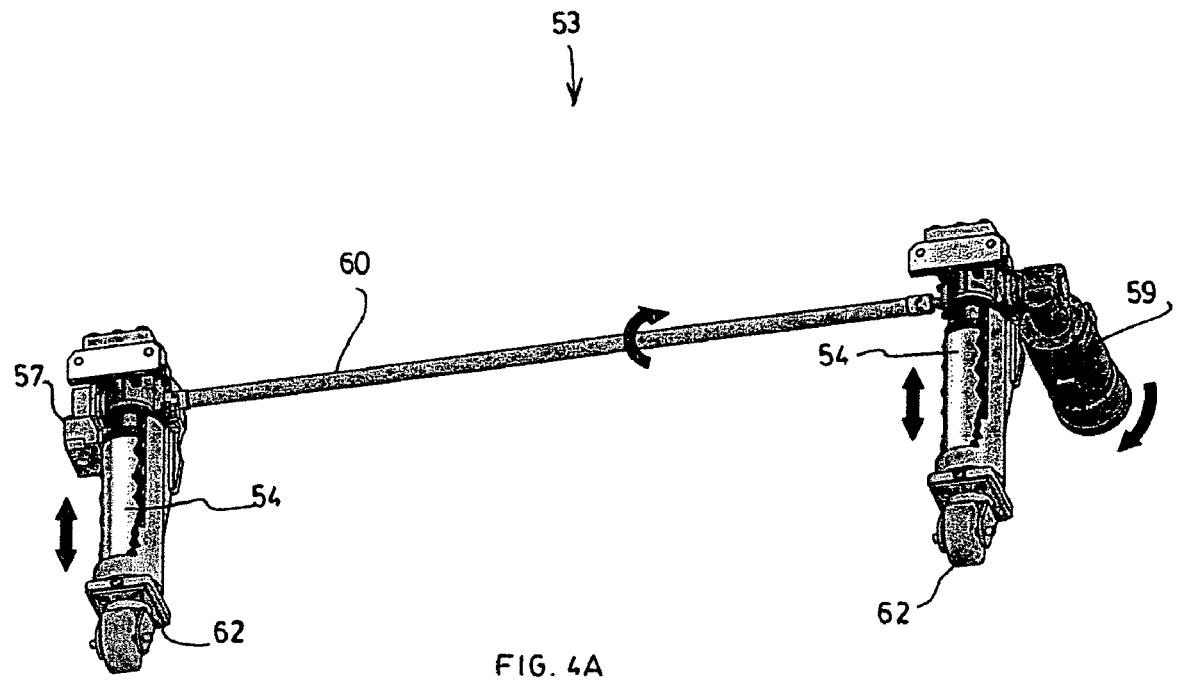
FIGS. 4A and 4B are perspective views of a portion of the vertical adjustment mechanism, shown in two different vertical positions.
Figure 4B:
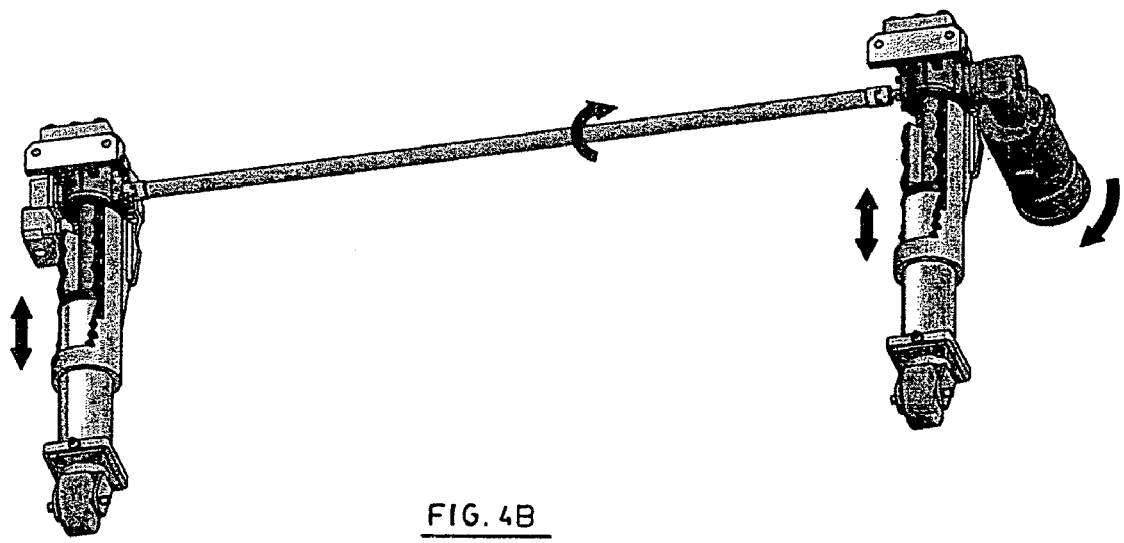

With reference to FIGS. 4A and 4B, the preferred embodiment of the second vertical support 53 is illustrated in detail. The second vertical support 53 includes a pair of laterally disposed second vertical actuators 54, which are preferably linear actuators, or more preferably screw jacks, but may also be, as will be apparent to one skilled in the art, another type of actuator, such as hydraulic or pneumatic actuators. The pair of linear actuators 54 are linked by a linking member 60, which ensures their coordinated operation. Preferably, the linking member 60 is a rigid control arm which mechanically synchronizes the extension and contraction of the pair of screw jacks 54, although other forms of linking are within the scope of the invention. A servo motor 59 and a position encoder 57 are further provided for driving and encoding the position of second vertical support 53. In the preferred embodiment, the encoder 57 and the servo motor 59 can each be disposed on one of the pair of second actuators 54 because of linking member 60, which ensures that the pair of second actuators work in unison.

The second vertical support 53 engages the supporting surface via a follower 62 at its lower extremity. In the preferred embodiment, the follower 62 is a castor wheel for each of the pair of second vertical actuators 54. Whereas the first vertical support 51 is fixed to a supporting surface during operation by base 30, the second vertical support 53 is operable to follow as the horizontal adjustment mechanism 26 rotates the belt assembly 10 in the horizontal plane about vertical pivot 36 while impeding this motion as little as possible. Other devices or arrangements for allowing the follower 62 to travel across the supporting surface during rotation of the belt assembly 10 are, as will be apparent to one of ordinary skill in the art, well within the scope of the invention.

The presence of castor wheels 62 is additionally advantageous with regard to the operation of the vertical adjustment mechanism 28. While the first vertical support 51 is hingedly connected to the belt assembly 10 by bracket 55 in order to allow the first vertical support 51 to remain substantially vertical while the belt assembly 10 is inclined, in the preferred embodiment the second vertical support 53 is rigidly fixed to the belt assembly 10 and the castor wheels 62 allow a continued contact with the ground, and hence continued vertical support, regardless of the angle of inclination of the belt assembly 10. As illustrated in FIGS. 3A to 3D, the first vertical actuator maintains its substantially vertical orientation, regardless of the inclination of the belt assembly 10, while the second vertical support 54 inclines along with the belt assembly 10.

By raising and lowering the vertical actuators 52 and 54 individually, or in combination, the belt assembly 10 can be lowered, inclined towards the first end 16, inclined towards the second end 20, or raised as illustrated in FIGS. 3A to 3D, respectively. Moreover, the belt assembly 10 can achieve any inclination or position between these above-noted extremes.

Control Unit

Figure 7:
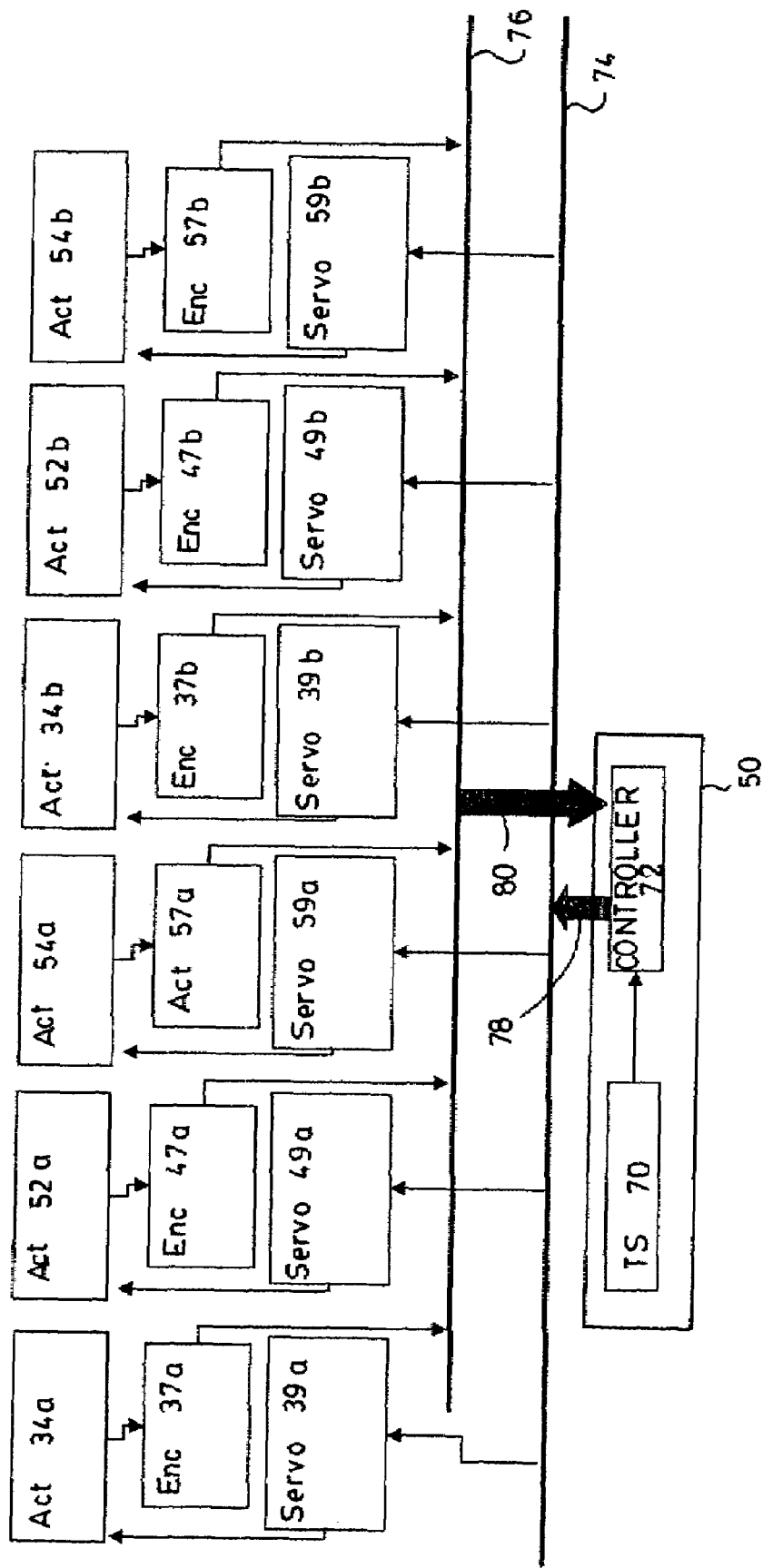
FIG. 7 is a block diagram which shows the schematic structure of a control unit for automated adjustment system as shown in the previous Figures.

With reference to FIGS. 2 and 7, a block diagram representing the operation of the control unit 50 is illustrated. In the illustrated embodiment, the control unit 50 controls adjustment of the first and second belt assemblies 10a and 10b via the horizontal actuators 34a and 34b, the first vertical actuators 52a and 52b, and the second vertical actuators 54a and 54b. While the control unit 50 is illustrated herein controlling two belt assemblies, control of a single belt assembly, or more than two belt assemblies, is well within the scope of the present invention.

In the preferred embodiment, a touch screen interface 70 is provided for use by an operator. Operator instructions are transmitted from the touch screen interface 70 to a controller 72 which processes the instructions and transmits corresponding control signals 78 from the control unit 50 to the output bus 74 for delivery to one or more of the servos 39a, 49a, 59a, 39b, 49b and 59b, which in turn are operative to drive the expansion and contraction of the actuators 34a, 52a, 54, 34b, 52b and 54b. Each of the actuators 34a, 52a, 54a, 34b, 52b and 54b are in communication with respective position encoders 37a, 47a, 57a, 37b, 47b and 57b, which encode the position of each actuator and are operable to transmit position data 80 back to controller 72 via input bus 76.

Should the operator wish to adjust the horizontal angle of the first belt assembly 10a, for example, a command (or commands) to that effect is entered into the control unit 50 via the touch screen 70, processed by controller 72 which then sends a corresponding control signal 78 to, inter alia, the servo motor 39a via output bus 74. In turn, the servo 39a is operable to expand or contract the horizontal adjustment actuator 34a in response to the control signal 78. This positional adjustment is encoded by the encoder 37a, which feeds back position data 80 to the control unit via input bus 76. As will be apparent to a person skilled in the art, an operator's commands may require the expansion or contraction of a combination of the actuators 34a, 52a, 54, 34b, 52b and 54b in order to generate the desired adjustment. In such a case, two or more control signals 80, destined for two or more of the servos 39a, 49a, 59a, 39b, 49b and 59b will be transmitted via output bus 74.

Once a set of planks 40 having a given width have been handled, the orientation of the speed reduction belt assembly 10 can be adjusted for the next set of planks 40 having a different width (and therefore requiring a different slow-down angle) with the control unit 50. Similarly, the inclination and height of the assembly can be adjusted between two loads of planks according to the variation in the planks' lengths.

In order to further automate the adjustment of the belt assemblies, the controller 72 is operable to store and execute at least one preset for a given type of plank and the corresponding belt alignment. Preferably, the controller 72 stores a series of presets for various sizes and types of planks, and their corresponding belt alignments. Advantageously, an operator can select from a list of possible plank types and the control unit will adjust the belt assembly's horizontal orientation, vertical orientation and height to their optimal values accordingly.

In a further preferred embodiment, the belt motor 22, and hence the translational speed of the upper side 24 of the belt 12, is also controllable by user control unit 50.

As being now better appreciated, the present invention is an improvement and presents several advantages over other related devices and/or methods known in the prior art. Indeed, the present invention is particularly advantageous in that it provides an automated control capability to the adjustment of speed reduction belt assemblies.

Of course, numerous modifications could be made to the above-described embodiments without departing from the scope of the invention, as apparent to a person skilled in the art. While a specific embodiment of the present invention has been described and illustrated, it will be apparent to those skilled in the art that numerous modifications and variations can be made without departing from the scope of the invention as defined in the appended claims.

The invention claimed is:

1. An automated adjustment system for positioning a speed reduction belt assembly to receive an elongated wood article exiting a processing machine, the speed reduction belt assembly having opposite first and second ends, the system comprising:
   a horizontal adjustment mechanism operable to adjust an angle of the speed reduction belt assembly in a horizontal plane;
   a vertical adjustment mechanism operable to adjust the height of one of the first and second ends of the belt assembly relative to the other or the first and second ends of the belt assembly, thereby adjusting an inclination of the belt assembly, the vertical adjustment mechanism comprising first and second vertical supports for supporting the first and second ends of the belt assembly, each vertical support being positioned at a respective one of the first and second ends; and
   a control unit in communication with the horizontal and vertical adjustment mechanisms for sending control signals thereto, the control signals determining the angle and inclination of the belt assembly.

2. The automated adjustment system of claim 1, wherein the horizontal adjustment mechanism comprises:
   a fixable base;
   a substantially vertical pivot provided between the fixable base and the belt assembly for enabling the belt assembly to pivot about the base in the horizontal plane; and
   a horizontal adjustment actuator operable to rotate the belt assembly about the substantially vertical pivot.

3. The automated adjustment system of claim 2, wherein the horizontal adjustment actuator is a linear actuator aligned in the horizontal plane and fixed to the base; the horizontal adjustment mechanism further comprising a horizontal arm projecting from the substantially vertical pivot; the linear actuator engaging the horizontal arm for selecting the angle of the belt assembly in the horizontal plane.

4. The automated adjustment system of claim 3, wherein the horizontal arm comprises a substantially vertical pin and the horizontal adjustment actuator comprises a corresponding slot for receiving the substantially vertical pin.

5. The automated adjustment system of claim 3, wherein the linear actuator comprises a screw jack driven by a servo motor and controllable by the control unit.

6. The automated adjustment system of claim 3, wherein the linear actuator further comprises a position encoder for communicating position data to the control unit.

7. The automated adjustment system of claim 1, wherein the first vertical support is hingedly connected to the belt assembly, the first vertical support comprising a first vertical actuator.

8. The automated adjustment system of claim 7, wherein the second vertical support comprises a second vertical actuator, thereby enabling the vertical adjustment mechanism to adjust the height and inclination of the belt assembly.

9. The automated adjustment system of claim 8, wherein the first vertical actuator mechanism comprises a first linear actuator and the second vertical actuator mechanism comprises a pair of laterally disposed second linear actuators.

10. The automated adjustment system of claim 9 wherein the pair of second linear actuators are linked by a linking member for ensuring a coordinated operation thereof.

11. The automated adjustment system of claim 10 wherein the first linear actuator comprises a screw jack and pair of second linear actuators comprises a screw jack, the screw jacks being driven by respective servo motors, the servo motors being controllable by the control unit.

12. The automated adjustment system of claim 11 wherein the first linear actuator further comprises a position encoder and the pair of second linear actuators further comprises a position encoder, the position encoders for communicating position data to the control unit.

13. The automated adjustment system of claim 11 wherein the linking member is a rigid control arm.

14. The automated adjustment system of claim 1 wherein the first vertical support comprises a substantially vertical pivot and a first vertical actuator hingedly connected to the first end of the belt assembly, and the horizontal and vertical adjustment mechanisms comprise:
a fixable base, the substantially vertical pivot being pivotable about the fixable base in the horizontal plane; and
a horizontal adjustment actuator operable to rotate the belt assembly about the substantially vertical pivot.

15. The automated adjustment system of claim 14 wherein the second vertical support comprises a follower at a bottom end thereof.

16. The automated adjustment system of claim 15 wherein the follower comprises a castor wheel.

17. The automated adjustment system of claim 14 wherein the first vertical actuator is aligned with the substantially vertical pivot.

18. The automated adjustment system of claim 17 where the first vertical actuator is a linear actuator comprising a base portion fixed to the fixable base and a driven portion fixed to the belt assembly and operable to translate vertically relative to the base portion; the substantially vertical pivot being operable to translate with the driven portion.

19. The automated adjustment system of claim 17 wherein the horizontal adjustment actuator is a linear actuator aligned in the horizontal plane and fixed to the fixable base; the horizontal adjustment mechanism further comprising a horizontal arm projecting from the substantially vertical pivot; the linear actuator engaging the horizontal arm for positioning selecting the angle of the belt assembly in the horizontal plane.

20. The automated adjustment system of claim 19 wherein the horizontal arm comprises a substantially vertical pin and the linear actuator comprises a corresponding slot for receiving the substantially vertical pin; the substantially vertical pin having a length at least equal to the travel of the vertical actuator.

21. The automated adjustment system of claim 1 wherein the control unit comprises an operator interface for allowing input by an operator for determining the angle and inclination of the belt assembly.

22. The automated adjustment system of claim 21 wherein the operator interface is a touch screen.

23. The automated adjustment system of claim 1 wherein the control unit comprises at least one preset, each preset being associated with a specific type of said elongated wood article, each of said at least one preset being selectable by an operator and comprising control signals determining an angle and inclination of the belt assembly associated with said specific type of elongated wood article.

24. The speed reduction belt assembly of claim 23 wherein the horizontal adjustment mechanism comprises:
a fixable base;
a substantially vertical pivot provided between the fixable base and the belt assembly for enabling the belt assembly to pivot about the base in the horizontal plane; and
a horizontal adjustment actuator operable to rotate the belt assembly about the substantially vertical pivot.

25. The speed reduction belt assembly of claim 23 wherein the first vertical support comprises a first vertical actuator, the first vertical support being hingedly connected to the belt assembly.

26. A speed reduction belt assembly for receiving an elongated wood article exiting a processing machine, said speed reduction belt assembly having opposite first and second ends and comprising an automated adjustment system, said automated adjustment system comprising:
a horizontal adjustment mechanism operable to adjust an angle of the speed reduction belt assembly in a horizontal plane;
a vertical adjustment mechanism operable to adjust the height of one of the first and second ends of the belt assembly relative to the other or the first and second ends of the belt assembly, thereby adjusting an inclination of the belt assembly, the vertical adjustment mechanism comprising first and second vertical supports for supporting the first and second ends of the belt assembly, each vertical support being positioned at a respective one of the first and second ends; and
a control unit in communication with the horizontal and vertical adjustment mechanisms for sending control signals thereto, the control signals determining the angle and inclination of the belt assembly.

* * * * *